Feb. 14, 1961 W. H. DUNN 2,972,137

SIGNAL TRANSLATING APPARATUS

Filed Nov. 1, 1957 3 Sheets-Sheet 1

INVENTOR.
WILLIAM H. DUNN

BY

Dewey J. Cunningham

ATTORNEY

Feb. 14, 1961 W. H. DUNN 2,972,137

SIGNAL TRANSLATING APPARATUS

Filed Nov. 1, 1957 3 Sheets-Sheet 2

2,972,137
Patented Feb. 14, 1961

2,972,137

SIGNAL TRANSLATING APPARATUS

William H. Dunn, Endicott, N.Y., assignor to International Business Machines Corporation, New York, N.Y., a corporation of New York Filed Nov. 1, 1957, Ser. No. 693,879

3 Claims. (Cl. 340—347)

Figure 1:
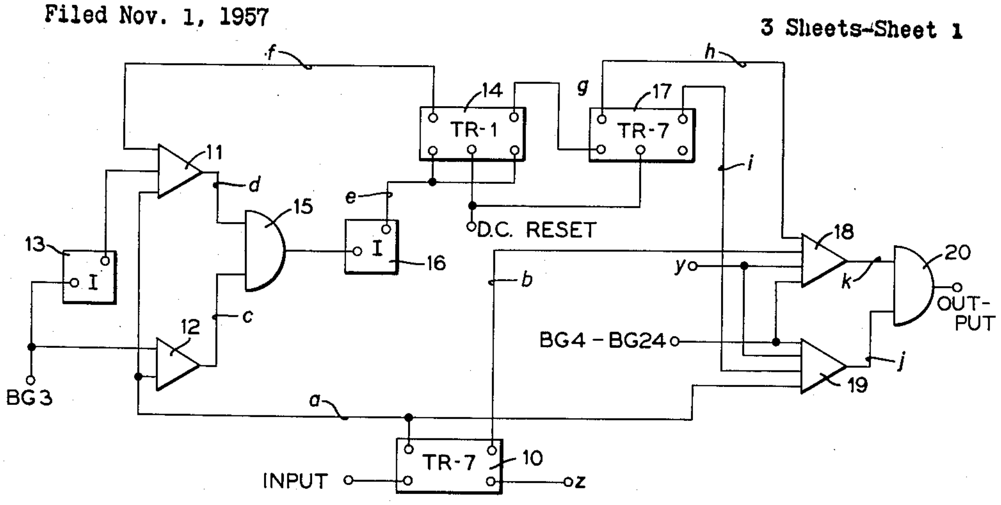

The present invention relates to signal translating apparatus and particularly to an arrangement which is adapted to receive a binary number and is responsive to a control signal associated with the number for producing either the true or two's complement of said binary number.

The arithmetic section of general purpose digital computers is capable of performing addition and subtraction operations. Two basic approaches for performing subtraction operations are used. One approach is to provide a first circuit capable of performing only adding operations and a second circuit capable of performing only subtraction operations. The other approach is to provide a circuit capable of performing adding operations only. In this case, a first number may be subtracted from a second number by complementing the first number and adding it to the second number. The result will appear in true form if the sign of the difference between the two numbers is positive and will appear in complement form if the sign is negative. If it is desired to have the complement form of the difference appear in true form, it is but necessary to recomplement the difference.

The present invention is concerned with an arrangement for changing the true form of the binary number into its two's complement form and vice versa as a function of a control signal associated with the number. Accordingly, a primary object of the present invention is to furnish a new and improved signal translating device which is controlled to produce either the true or two's complement form of a binary number.

Another object of the invention is to produce a new and improved two's complementing circuit which is comprised of a minimum of components and which is reliable in operation.

Other objects of the invention will be pointed out in the following description and claims and illustrated in the accompanying drawings, which disclose, by way of examples, the principle of the invention and the best mode, which has been contemplated, of applying that principle.

Figure 2A:
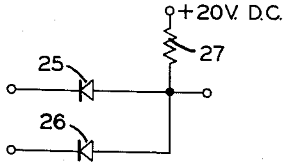
Figure 2B:
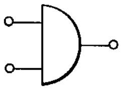
Figure 3A:
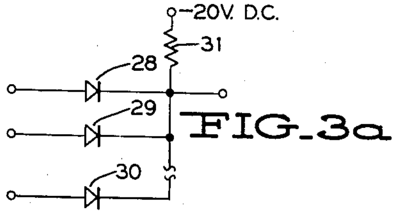
Figure 3B:
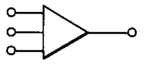
Figure 4A:
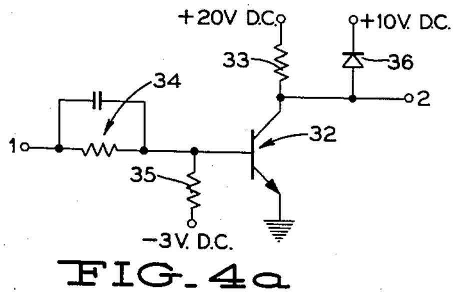
Figure 4B:
Figure 5A:
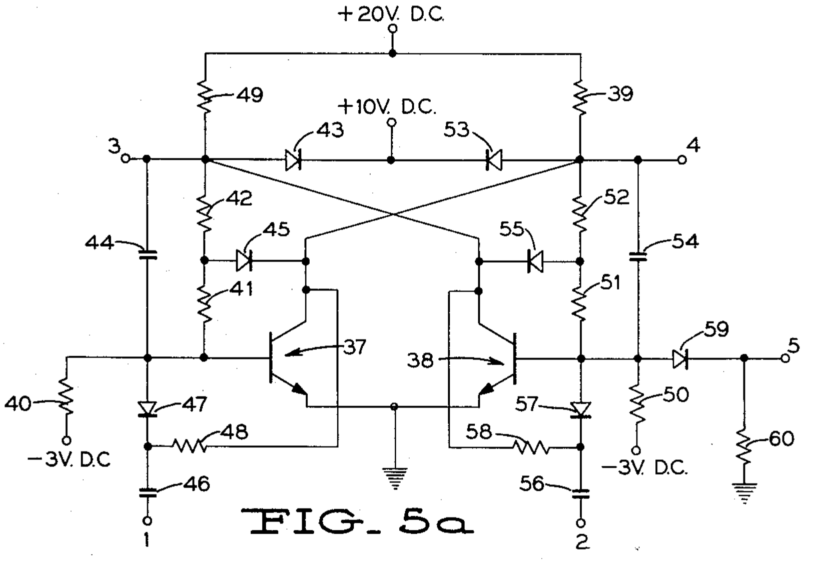
Figure 5B:
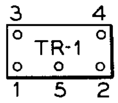
Figure 6A:
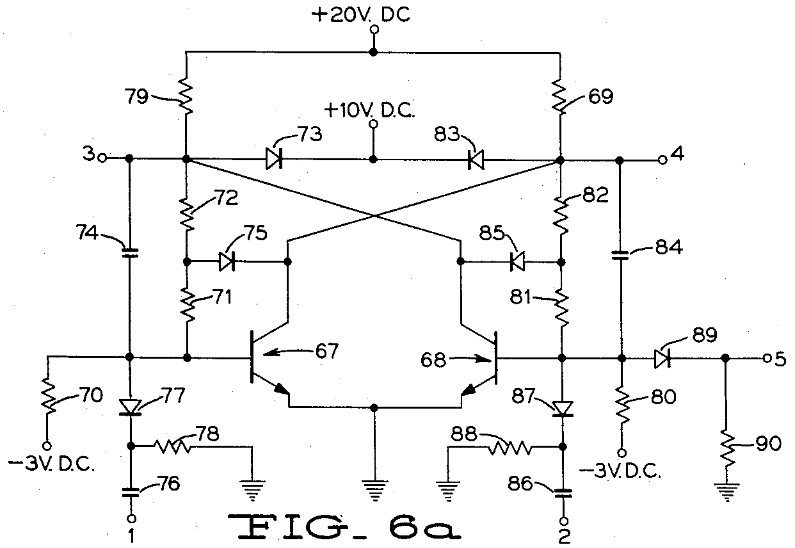
Figure 6B:
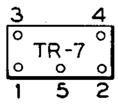
Figure 7:
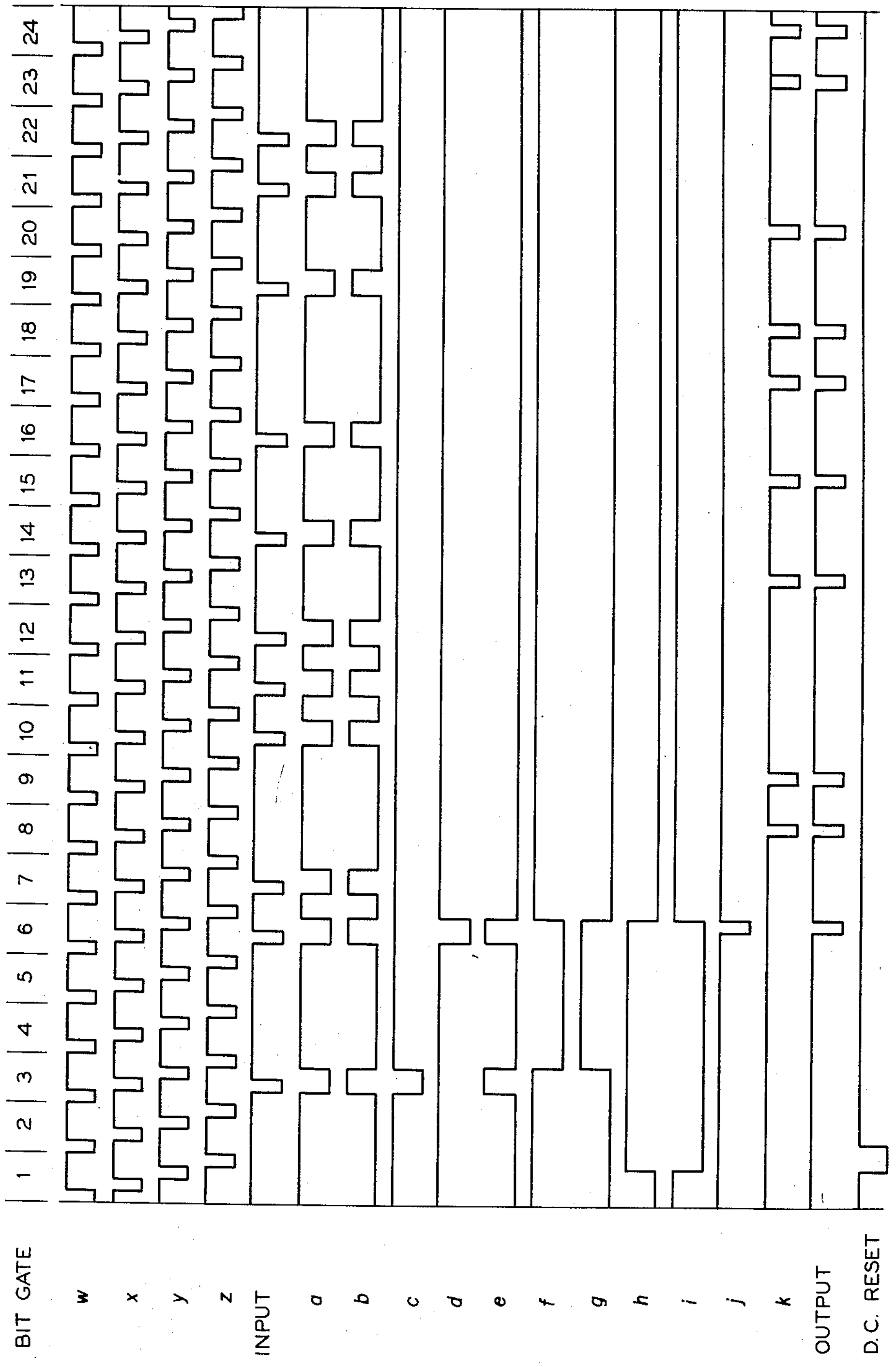

In the drawings:

Fig. 1 is a block diagram in the present invention;

Fig. 2*a* shows the schematic details of a logical OR circuit which is illustrated in block form in Fig. 2*b*;

Fig. 3*a* shows the schematic details of a logical AND circuit which is shown in block diagram form in Fig. 3*b*;

Fig. 4*a* shows the schematic details of an inverter circuit which is shown in block diagram form in Fig. 4*b*;

Fig. 5*a* and 6*a* show the schematic details of two forms of trigger circuits which are respectively illustrated in block form in Figs. 5*b* and 6*b*; and Fig. 7 shows a plurality of waveforms representing the signal conditions at certain points in the circuit of Fig. 1 for a sample input.

The process of finding the two's complement of a binary number whose highest order digit has a value of $2^n$ is to subtract the number from a number whose highest digit has a value of $2^{n+2}$ where the highest of this last mentioned number has a binary value of 1 and all lower order digits have a binary value of 0. For example, if the two's complement of the binary number 110110010 is desired, the following direct subtraction method may be used.

$$\begin{array}{r} 10000000000 \\ 110110010 \\ \hline 1001001110 \end{array}$$

In subtracting two digits, one from the other, each digit of the minuend is decreased by the amount of the corresponding digit of the subtrahend, and if the minuend digit thereby becomes less than 0, the minuend digit of the next higher order must be reduced by 1. That is, a 1 must be borrowed from the next higher order. Thus, in the example given, the two's complement of the binary number 110110010 is 1001001110. It will be noted that the two's complement contains an extra digit, i.e. whereas the binary number whose two's complement is sought contains nine digits, the two's complement contains ten digits. A binary 1 in the tenth digit position indicates the fact that the number is in complement form and is not to be construed as having a value of $2^{n+1}$ which would be added to the value determined by the other nine positions. Thus, the tenth, or $n+1$ position, may be used as a control for detecting the fact that the first nine digits are in complement form. Now if it is desirable to recomplement the two's complement, it is but necessary to go through the same process and the true binary number will be produced. This is illustrated in the following example.

$$\begin{array}{r} 10000000000 \\ 1001001110 \\ \hline 0110110010 \end{array}$$

It is apparent that the two's complement of the binary number already in two's complement form produces the true form of the number. It will be seen that a binary 0 exists now in the tenth digit position to indicate that the number is in true binary form.

Digital computers ordinarily deal with both positive and negative numbers. For example, a word to be treated may be comprised of twenty-four digits, each digit being in a particular digit position. The first two digits may represent nothing and provide time for switching operations to take place. The third digit position may be used to indicate the sign of the number found in the digit positions 4 through 23. A binary 0 in the third digit position may be used to indicate that the number in digit positions 4 through 23 is a positive number while a binary 1 in the third digit position would indicate that it is a negative number. Digit position 24 is reserved for use after the number in digit positions 4–23 has been operated upon by the two's complementing arrangement. If the two's complement has been produced, a binary 1 will appear in digit position 24.

The third digit position in the input word may also be used to indicate whether the binary number is in true or two's complement form. Thus, if a binary 0 exists in the third digit position, the number in digit positions 4 through 23 would be in true binary form, and if the binary 1 exists in the said third digit position, the number would be in two's complement form.

Whether the third digit position is used for sign control or complement control, the effect is the same. If the binary 0 exists in the third digit position, then the number in positions 4–23 will be left in the present condition. However, if a binary 1 exists in the third digit position, it will be necessary to provide the two's complement of the number in digit positions 4–23.

Briefly, the present invention utilizes a bistable device which is connected to receive a serial word of information such as the word described above, for example, and to supply outputs to a pair of gating circuits. When the sign or complement control digit position is reached, a logical circuit examines the binary value of this digit position and remembers if the two's complement is to be produced. If the two's complement is to be produced, one of the outputs of the bistable device is gated through one of the pair of the gating circuits until a time determined by the input binary number, following which the output of the bistable device is gated through the other of said pair of gating circuits.

Referring to Fig. 1, there is illustrated a detailed block diagram of the present invention. Before getting into a description of Fig. 1, an explanation will be given of typical circuits which may be utilized in the blocks illustrated in Fig. 1. While specific detail circuits are shown, it will be apparent that the present invention may utilize many other types of circuits for performing a similar function.

Fig. 2*a* shows a schematic diagram of a logical OR circuit for negative pulses, the block form of this circuit being shown in Fig. 2*b*. The cathodes of diodes 25 and 26 are connected to respective input terminals to which signals having one or the other of two levels are adapted to be applied. The plates of the diodes are commoned and connected to one end of a resistor 27, the other end of said resistor being connected to a voltage which is more positive than the most positive level of the input signal. The operation of the circuit is such that the output signal taken from the commoned plates of the diodes will follow the most negative level of the input signals.

Fig. 3*a* shows a schematic diagram of a logical AND circuit for negative pulses, the block form of this circuit being shown in Fig. 3*b*. The plates of diodes 28, 29, and 30 are connected to their respective input terminals and the cathodes of these diodes are commoned and connected to one end of a resistor 31, the other end of said resistor being connected to a negative source of D.C. potential. The output may be taken from the commoned cathodes at a suitable terminal. The output signal from this circuit follows the most positive input signal supplied to the plates of the diodes. The circuit is normally used for supplying negative output signal in response to a condition where all of the input signals are relatively negative. If any one of the input signals is relatively positive, then the output signal will also be relatively positive.

Fig. 4*a* shows the schematic details of an inverter circuit, the block form of which is shown in Fig. 4*b*. This circuit is comprised of an NPN transistor 32, the emitter of said transistor being connected to ground and the collector being connected through a resistor 33 to a positive source of D.C. potential. The input terminal 1 is connected by way of an RC network 34 to the base of the transistor, there being provided a resistor 35 from the base to a negative source of D.C. potential. The cathode of a diode 36 is connected to a positive source of D.C. potential which is less than the positive D.C. source of potential to which the resistor 33 is connected, and the plate of the diode is connected to the collector of the transistor to which the output terminal 2 is also connected. The operation of this inverter is similar to a standard grounded emitter inverter and is arranged such that a negative going input signal will cause the transistor to go into cutoff and result in the collector voltage rising toward the voltage connected to the upper end of resistor 33. Diode 36 prevents the voltage on the collector from going higher than the positive source of D.C. potential to which the cathode of diode 36 is connected. This diode serves as a clamp and aids in preventing saturation of the transistor which of course would slow down the operation in the inverter due to minority carrier storage. A return of the input voltage to the original level in a positive direction causes the collector voltage to drop to a point near ground.

Fig. 5*a* shows the schematic details of a trigger circuit of the type TR1 which is shown in block diagram form in Fig. 5*b*. This trigger is comprised of a pair of NPN transistors illustrated by reference numerals 37 and 38, each of which is connected in a grounded emitter configuration. Transistor 37 has its collector connected through resistor 39 to a positive source of D.C. potential. The base of transistor 37 is connected through a resistor 40 to a negative source of D.C. potential, said base being connected through resistors 41 and 42 to the collector of transistor 38, said collector being connected by way of diode 43 to a positive source of D.C. potential. A bypass condenser 44 is connected in parallel with resistors 41 and 42. A clamp diode 45 is provided between the junction of resistors 41 and 42 and the collector of transistor 37. The input signal to transistor 37 is adapted to be supplied to terminal 1 which is coupled by a capacitor 46 and a diode 47 to the base of the transistor. A resistor 48 is connected between capacitor 46 and diode 47 and the collector of transistor 37. Transistor 38 has its collector connected by way of resistor 49 to a source of positive D.C. potential. The base of transistor 38 is connected by way of resistor 50 to a negative source of D.C. potential and through resistors 51 and 52 to the collector of transistor 37. The last mentioned collector is connected by way of a diode 53 to a positive source of D.C. potential. Bypass condenser 54 is provided in parallel with resistors 51 and 52. The input to transistor 38 is supplied to terminal 2 which is coupled by a capacitor 56 and a diode 57 to the base of transistor 38, the collector of transistor 38 being connected by way of resistor 58 to a point between capacitor 56 and diode 57.

For the purposes of this description, the trigger will be considered OFF when transistor 37 is conducting and transistor 38 is at cutoff. With transistor 37 conducting, the collector thereof will be at substantially ground potential and will thereby hold the base of transistor 38 sufficiently negative to maintain it at cutoff. Therefore, the output voltage at terminal 4 will be at substantially ground while the output voltage at terminal 3 will be at substantially +10 volts. It will be seen that with transistor 38 at cutoff, the collector thereof will attempt to go to the +20 volt D.C. but will be prevented therefrom due to the connection of the output terminal 3 by way of diode 43 to the +10 volt D.C. Thus, output terminal 5 cannot go above +10 volts D.C. A negative input signal to terminal 1 is utilized to turn the trigger ON. This input signal drops the voltage at the base of transistor 37 which causes the transistor to go toward cutoff, thereby allowing the collector voltage thereof to rise to +10 volts. When this occurs, the base of transistor 38 will be raised in potential and allow the transistor to go into conduction. This causes the collector of transistor 38 to drop in potential and thereby hold transistor 37 biased at cutoff. Under these circumstances, i.e. with trigger ON, the voltage at terminal 3 will be at substantially ground while the voltage at terminal 4 will be at +10 volts D.C.

The trigger may be reset OFF by supplying a negative input pulse to terminal 2 which causes transistor 38 to go out of conduction which, in going out of conduction, causes transistor 37 to go into conduction. This, of course, reverses the potentials at output terminals 3 and 4. A further way of resetting the trigger to its OFF condition is by way of a pin 5 which is connected through diode 59 to the base of transistor 38, said terminal 5 being connected by way of resistor 60 to ground. Therefore, if a D.C. RESET signal in the form of a relatively negative voltage is supplied to pin 5, the base of transistor 38 will be lowered to the point where transistor 38 will go out of conduction and in so doing cause transistor 37 to go into conduction. Of course, if the trigger is already OFF, the application of the D.C. RESET signal to pin 5 leaves the trigger in the OFF state.

The trigger shown in Fig. 5*a* is utilized where pulses may appear simultaneously at input terminals 1 and 2. To assure that the trigger will change state in response to such a condition, resistors 48 and 58 are utilized to produce a bias on either diode 47 or 57, respectively, to prevent an input pulse from reaching the base of the transistor that is already in a non-conducting condition.

Fig. 6*a* shows the schematic details of a trigger circuit of the type TR7 which is shown in block diagram form in Fig. 6*b*. This trigger comprises a pair of transistors 67 and 68 which are connected in the grounded emitter configuration. The collector of transistor 67 is connected by way of a resistor 69 to a positive source of D.C. potential while the base of the transistor is connected through resistor 70 to a negative source of D.C. potential. Resistors 71 and 72 connect the base of transistor 67 to an output terminal 3 which is also connected by way of diode 73 to a positive source of D.C. potential. Bypass condenser 74 is provided in parallel with resistors 71 and 72. The collector of transistor 67 is connected to the cathode of the diode 75 whose plate is connected to the midpoint between resistors 71 and 72. The input to transistor 67 is supplied to terminal 1 which is coupled by a capacitor 76 and a diode 77 to the base of transistor 67, there being a resistor 78 connected between ground and the point between capacitor 76 and diode 77. The collector of transistor 68 is connected by way of a resistor 79 to a positive source of D.C. potential while the base thereof is connected through a resistor 80 to a negative source of D.C. potential. Resistors 81 and 82 are connected between the base of transistor 68 and output terminal 4, said output terminal being connected through a diode 83 to a positive source of D.C. potential. Bypass condenser 84 is connected in parallel with resistors 81 and 82. A diode 85 is connected between the midpoint of resistors 81 and 82 and the collector of transistor 68. The input signal which may be utilized to reset the trigger to its OFF condition may be supplied to terminal 2 which is coupled by a capacitor 86 and diode 87 to the base of the transistor 68, there being a resistor 88 connecting the midpoint between capacitor 86 and diode 87 to ground. A separate reset may be accomplished by supplying a D.C. RESET signal to terminal 5 which is connected by means of a diode 89 to the base of transistor 68, there being a resistor 90 connected between the input terminal 5 and ground. The operation of the trigger shown in Fig. 6*a* is substantially identical to that shown in Fig. 5*a*, the primary difference residing in the fact that in Fig. 5*a* the resistors connected to the input capacitors are connected to the collectors of the transistors associated therewith while in the Fig. 6*a* circuit these resistors are connected to ground. The trigger of Fig. 6*a* is used where pulses never occur simultaneously at input terminals 1 and 2. Thus, it is unnecessary to bias diodes 77 and 87 to prevent a negative pulse from reaching the base of a non-conducting transistor.

Referring now to Fig. 7, there is provided a plurality of wave-forms utilized in the present invention. A negative bit gate pulse is provided for each of bit gate times BG1 through BG24.

During each bit gate pulse, clock pulses, *w*, *x*, *y* and *z* are produced, said clock pulses being successively produced in the order recited. The leading edge of the *w* pulse is coincident with the leading edge of each bit gate pulse while the trailing edge of the *z* pulse coincides with the trailing edge of each bit gate pulse. A sample input signal representing one word is illustrated and the waveforms indicative of the voltages appearing at various points in the circuit of Fig. 1 for the sample word are shown. It will be noted that the input signal occurs during *x* time while the output signal occurs at *y* time. Thus, there is only one-quarter bit delay between the input and output. In the example shown, a binary 1 is shown in the input signal at BG3 time, thus indicating that the two's complement of the digits in positions 4 through 23 is to be produced.

Referring now to Fig. 1, there is illustrated a trigger 10 connected to receive the digital word whose two's complement may be desired, this digital word being termed the INPUT. Each negative pulse in the INPUT signal will turn the trigger ON and the *z* pulse which follows the aforementioned pulse will reset the trigger OFF. The output from the left side of trigger 10 is supplied to each of the AND circuits 11 and 12. The remaining input to AND circuit 12 is the bit gate signal BG3. It is during BG3 time that the decision is made as to whether the true or the two's complement is desired of the particular word appearing as the INPUT signal. In the event the INPUT has a binary 1 which occurs in coincidence with BG3, the trigger 10 will be turned ON and result in a relatively negative voltage being supplied to AND gate 12 at this time. Inasmuch as BG3 is also relatively negative during this time, an output signal will be supplied through the OR circuit 15 to an inverter 16 thereby causing a relatively positive signal to be supplied from inverter 16 to each side of the trigger 14. Trigger 14 operates as a conventional straight binary trigger and is further provided with a D.C. RESET signal which is applied at the end of each word. At the end of the word preceding the word now being received, trigger 14 would have been reset OFF. Inasmuch as the first output from inverter 16 just described is in the form of a positive going voltage, no action occurs in trigger 14 until the *z* pulse is supplied to trigger 10 so as to reset trigger 10 OFF. At this time, the output voltage at the left side of trigger 10 rises and causes a positive going voltage to appear at the output of AND circuit 12 as well as OR circuit 15. The inverter will now supply a negative going voltage to trigger 14 so as to turn the trigger ON. The output from the left side of trigger 14 will now be in the form of a relatively negative voltage which is supplied to AND circuit 11. The other input to this last mentioned circuit is supplied from an inverter 13, the input to said inverter being BG3. This means that the output of inverter 13 will be relatively negative at all times except during time BG3. When the first binary 1 appears at the INPUT following BG3 time, a negative pulse is supplied through AND circuit 11 and OR circuit 15 to inverter 16. The output of the inverter is a positive going voltage which has no effect on trigger 14. As soon as the next *z* clock pulse occurs, the output of the inverter reverses and turns trigger 14 OFF. As this trigger goes OFF, a negative going voltage is supplied therefrom to trigger 17, thereby turning trigger 17 ON.

To this point it will be seen that the circuit means including the elements 11—16 forms a delay device which, in order to turn trigger 17 ON, must receive a binary 1 at BG3 time and a binary 1 at some digit time following BG3 time. However, trigger 17 is not turned ON until the time of the last-mentioned binary 1.

The output from the left side of trigger 10 is also supplied to an AND circuit 19 while the output from the right side of trigger 10 is supplied to an AND circuit 18. Other inputs to each of the AND circuits 18 and 19 are the *y* clock pulses and the bit gate pulses BG4 through BG24. Hence, the only time that an output pulse can be supplied from either of the AND circuits 18 or 19 will be during BG4 through BG24 in coincidence with the *y* clock pulse. The AND circuit 18 is connected to receive the output from the left side of a trigger 17 while the AND circuit 19 is connected to receive the output from the right side of the trigger. Since trigger 17 is reset OFF at the end of the word, the output from the left side of the trigger will normally be relatively positive while the output from the right side of the trigger will normally be relatively negative.

It will be noted that during BG4 and BG5 times the INPUT shown in the waveforms in Fig. 7 has a binary value of 0. Therefore, the output voltage from the right side of trigger 10 will be relatively negative during these bit gate times. However, the output from the left side of trigger 17 is relatively positive at this time and therefore no output can be supplied from AND circuit 18. Inasmuch as the output from the left side of trigger 10 is relatively positive, no outputs can be received from AND circuit 19 at this time. Therefore, the voltage level at the output or OR circuit 20, which is connected to receive the outputs of AND circuits 18 and 19, will be relatively positive, indicating a binary 0 during each of the times BG4 and BG5.

At BG6 time, a binary 1 occurs in the INPUT resulting in a negative going voltage being applied to AND circuit 11 and AND circuit 19. Since the other two inputs to AND circuit 11 are also relatively negative at this time, a relatively negative voltage is supplied through OR circuit 15 to the inverter 16, the output from said inverter being in the form of a positive going voltage which is supplied to trigger 14. As previously mentioned, trigger 14 remains in the state it is presently in, i.e. it is ON as a result of the binary 1 which occurred at BG3 time. At *y* time an output will be supplied from AND circuit 19. Following this, trigger 10 is turned OFF by the *z* pulse which occurs at the end of BG6 time. When this occurs, the output of the left side of trigger 10 will no longer be relatively negative and therefore the input to inverter 16 will be a positive going voltage so as to produce a negative going voltage as the output therefrom. This means that trigger 14 will now be reset OFF. At the time the last mentioned trigger is turned OFF, a negative going voltage is supplied to trigger 17, thereby turning this trigger ON. Thus, during BG7 time the output from the left side of trigger 17 will be relatively negative while the output from the right side will be relatively positive. For the remainder of the INPUT word AND circuit 19 is inhibited and can produce no outputs. Whether AND circuit 18 supplies an output depends upon the output from the right side of trigger 10. If the input has a binary 1 at a particular bit gate time, it will result in a relatively positive voltage being supplied from the right side of trigger 10 to gate 18 so that no output from AND circuit 18 will be produced at this time. However, if a binary 0 exists in the INPUT, a relatively negative voltage will be supplied from the right side of trigger 10 which will result in a negative going voltage from AND circuit 18 and OR circuit 19 as the OUTPUT.

It will be noted that a binary 1 is produced during BG24 at the output. This indicates that the output is in two's complement form.

From the above, it will be seen that the present invention takes advantage of the fact that the two's complement of a particular binary number will be identical with the binary number up to and including the time when the first binary 1 occurs. Thereafter, the two's complement is the inverse of the true binary number.

While there have been shown and described and pointed out the fundamental novel features of the invention as applied to a preferred embodiment, it will be understood that various omissions and substitutions and changes in the form and details of the device illustrates and in its operation may be made by those skilled in the art, without departing from the spirit of the invention. It is the intention, therefore, to be limited only as indicated by the scope of the following claims.

What is claimed is:

1. Signal translating apparatus for receiving serial binary information including a binary word of digits preceded by a control signal digit and for providing alternatively either the true form or the two's complement form of said word, said alternative form being determined by the preestablished binary value of said control digit, comprising, in combination: input means adapted to receive said information and to produce both direct and inverse representations of said word, said input means including a bistable means; control means adapted to receive said control digit and said direct representation and to produce first and second gating signals, said control means including a logic circuit to examine said control digit and to determine said binary value thereof, a memory circuit to remember if said two's complement is to be provided by said apparatus, and a bistable circuit responsive to said memory circuit to produce said gating signals; and output means adapted to receive said representations and said gating signals and to provide said translated signal, said output means including a gating circuit, said gating signals conditioning said output means to provide either said word or the portion thereof up to and including its first binary 1 and thereafter the inverse of its digits, as determined by said pre-established binary value of said control digit.

2. Signal translating apparatus for receiving serial binary information including a binary word of digits preceded by a control digit and for providing alternatively either the true form or the two's complement form of said word, said alternative form being determined by the preestablished binary value of said control digit, comprising, in combination: input means adapted to receive said information and to produce both direct and inverse representations of said word, said input means including a bistable device; control means adapted to receive said control digit and said direct representation and to produce first and second gating signals, said control means including a first circuit to examine said control digit and to determine said binary value thereof, said first circuit having first and second AND circuits adapted to receive said control digit and direct representation, respectively, and a first OR circuit to receive the outputs thereof and to produce a first OR circuit output, gating means connected to said first circuit to make said first AND circuit responsive to said control digit and to make said second AND circuit responsive to said digits of said word, a circuit adapted to receive and remember said first OR circuit output and to produce first and second storage signals, said circuit including a memory circuit, said first storage signal conditioning said second AND circuit, and a bistable circuit to receive said second storage signal and to produce said first and second gating signals; and output means adapted to receive said representations and said gating signals and to provide said translated signal, said output means including a second circuit having third and fourth AND circuits to receive said direct and inverse representations, respectively, and a second OR circuit connected thereto to provide said translated signal, said third AND circuit being gated by said first gating signal and said fourth AND circuit being gated by said second gating signal, said gating signals conditioning said output means to provide either said word or the portion thereof up to and including its first binary 1 and thereafter the inverse of its digits, as determined by said pre-established binary value of said control digit.

3. Signal translating apparatus for receiving serial binary information including a binary word of digits preceded by a control digit and for providing alternatively either the true form or the two's complement form of said word, said alternative form being determined by the preestablished binary of said control digit, comprising, in combination: input means adapted to recevie said information and to produce both direct and inverse representations thereof, said input means including a first bistable device and a first clock pulse means to reset said first bistable device before each input digit of said information; control means adapted to receive said direct representation and to produce first and second gating signals, said control means including a first circuit to examine said control digit and to determine said binary value thereof, said first circuit having first and second AND circuits adapted to receive said direct representation and a first OR circuit to receive the outputs thereof and to produce a first OR circuit output, gating means connected to said first circuit to make said first AND circuit responsive to said control digit and to make said second AND circuit responsive to said digits of said word, said gating means including a first bit pulse timing means to open said first AND circuit at said control digit time and to open said second AND circuit at times of said digit of said word and a first inverter connected between said bit pulse timing means and said second AND circuit, a circuit adapted to receive and remember said first OR circuit output to produce first and second storage signals, said first storage signal conditioning said second AND circuit, said circuit including a second inverter connected after said first OR circuit and a bistable trigger connected after said second inverter to produce said first and second storage signals, a second bistable device connected to said bistable trigger to receive said second storage signal and to produce said first and second gating singals, and reset means to reset said bistable trigger and said second bistable device to their initial states after said apparatus has provided said translated signal; and output means adapted to receive said representations and said gating signals and to provide said translated signal, said gating signals conditioning said output means to provide either said word or the portion thereof up to and including its first binary 1 and thereafter the inverse of its digits, as determined by said pre-established binary value of said control digit, said output means including a second circuit having third and fourth AND circuits to receive said direct and inverse representations, respectively, a second OR circuit connected thereto to provide said translated signal, said third AND circuit being conditioned by said first gating signal and said fourth AND circuit being conditioned by said second gating signal, and a timing means to gate said third and fourth AND circuits during said word time, said timing means including a second clock pulse means and a second bit pulse timing means.

References Cited in the file of this patent

UNITED STATES PATENTS 2,512,038 Potts ---------------- June 20, 1950

UNITED STATES PATENT OFFICE
CERTIFICATE OF CORRECTION

Patent No. 2,972,137 February 14, 1961

William H. Dunn

It is hereby certified that error appears in the above numbered patent requiring correction and that the said Letters Patent should read as corrected below.

Column 8, line 57, after "binary" insert -- value --; column 9, line 12, line 58, for "recevie" read -- receive --; for "singals" read -- signals --.

Signed and sealed this 19th day of September 1961.

(SEAL)
Attest:

ERNEST W. SWIDER
Attesting Officer

DAVID L. LADD
Commissioner of Patents

USCOMM-DC